United States Patent [19]

Deusser et al.

[11] Patent Number: 4,886,336
[45] Date of Patent: Dec. 12, 1989

[54] STORAGE DEVICE FOR A SPARE LENGTH OF AT LEAST ONE OPTICAL FIBRE

[75] Inventors: Peter G. Deusser, Cologne; Detlef M. Boehm, Neunkirchen-Seelscheid; Johann A. Becker, Overath, all of Fed. Rep. of Germany

[73] Assignee: U.S. Philips Corp., New York, N.Y.

[21] Appl. No.: 162,525

[22] Filed: Mar. 1, 1988

[30] Foreign Application Priority Data

Mar. 3, 1987 [DE] Fed. Rep. of Germany ....... 3706768

[51] Int. Cl.$^4$ .............................................. G02B 6/36
[52] U.S. Cl. .............................. 350/96.20; 350/96.21
[58] Field of Search ................... 350/96.2, 96.21, 96.22

[56] References Cited

U.S. PATENT DOCUMENTS 4,722,585  2/1988  Boyer .................................. 350/96.2
4,765,708  8/1988  Becker et al. ................. 350/96.21 X

FOREIGN PATENT DOCUMENTS 3248003  6/1984  Fed. Rep. of Germany .
2567657  1/1986  France .............................. 350/96.22

*Primary Examiner*—William L. Sikes
*Assistant Examiner*—John Ngo
*Attorney, Agent, or Firm*—William L. Botjer

[57] ABSTRACT

The invention relates to a storage device for a spare length of at least one optical fibre which emerges from a cable end, which stroage device can be arranged in the vicinity of the cable end and comprises a flat stroage space in which the spare length is arranged in the form of a coil, the end of the optical fibre which leads to the joint being extractable, during which operation the diameter of the coil is reduced, the storage space comprising guide walls which define the minimum inner coil diameter, the maximum outer coil diameter and also the axial height. In order to ensure that the mobility length required for moving the storage device away from a housing can be accommodated in an ordered manner, the storage space is divided into two winding spaces (7, 8), one of which (8) accommodates the connection length required for forming the joint while the other storage space (7) accommodates a mobility length which is required for moving the storage device away from the cable end, lengths of the optical fibre being independently extractable from both winding spaces (7, 8).

19 Claims, 2 Drawing Sheets

STORAGE DEVICE FOR A SPARE LENGTH OF AT LEAST ONE OPTICAL FIBRE

BACKGROUND OF THE INVENTION

The invention relates to a storage device for a spare length of at least one optical fibre which emerges from a cable end, which storage device can be arranged in the vicinity of the cable end and comprises a flat storage space in which the spare length is arranged in the form of a coil, an end of the optical fibre which leads to a joint being extractable, during which operation the diameter of the coil is reduced, the storage space comprising guide walls which determine the minimum inner coil diameter, the maximum outer coil diameter and also the axial height.

A device of this kind is known from DE-OS 32 48 003. Therein, ends of two optical cables are fed into a sleeve housing. The exposed ends of the optical fibres of the optical cable are arranged in the form of turns in storage containers.

The excess lengths required for the formation of a splice of for repairs at a later stage can be extracted from and re-introduced into the storage containers. The splice is subsequently secured in the sleeve housing.

In order to splicing or repair also at a later instant, notably in the case of a plurality of stacked storage containers, good results have been obtained with embodiments where the individual storage containers can be removed from a sleeve housing or a distribution box, thus enabling free access to the splices at any time (see Int. Wire and Cable Symposium, Proceedings 1983, page 47).

SUMMARY OF THE INVENTION

It is the object of the invention to construct a device of the kind set forth so that the free or mobility lengths required for removing the cassette can be storage in an ordened manner.

This object is achieved in that the storage space is subdivided into two winding spaces, one of which accommodates the connection lengths required for forming the joint whilst the other winding space accommodates a mobility length required for moving the storage device away from the cable ends, lengths of the optical fibre being independently extractable from both winding spaces.

The invention offers the advantage that sufficiently long mobility lengths can be realized which can be readily accommodated in the sleeve housing or the distribution box without damage and without excessive bending.

In order to ensure that the appropriate mobility lengths and connection lengths are always maintained in a defined manner without, for example, part of the mobility length being taken along when the connection length is extracted, a part of the optical fibre or fibre ribbon which is situated between the mobility length and the connection length is preferably secured to the storage device by a clamping device.

The clamping device can simply be formed by soft-elastic elements wherebetween the optical fibres are retained.

The introduction of the mobility length and the connection length, together forming the spare length, is facilitated in that the clamping device comprises a slidable element wherebyy the optical fibre or fibre ribbon can be pressed against a fixed wall. Using such a device, the optical fibre or the fibre ribbon can be secured after its unimpeded introduction.

In the case of a flat construction of the storage device clamping-free extraction and introduction of the mobility length or the connection length is possible in that the mobility length and the connection length are wound therein in a coiled manner. Preferably, in a storage device constructed for the storage of a single optical fibre the distance between the guide walls is smaller than 1.3 times the thickness of the optical fibre; in a storage device constructed for the storage of a fibre ribbon consisting of a flat arrangement of juxtaposed optical fibres the distance between the guide walls is preferably slightly larger than the width of the fibre ribbon. Such arrangements result in particularly flat storage devices. However, a non-clamping coiled arrangement of the optical fibre of fibre ribbon is stilled ensured, therein.

In a preferred embodiment, small dimensions are achieved in that the winding spaces are arranged coaxially with respect to one another. A flat construction is then obtained in that the winding spaces are arranged so as to be interleaved in one plane. Particularly small sides can be achieved by arranging the winding spaces coaxially one over the other.

In the inserted condition, the bending radii of the optical fibres should be so large that the optical attenuation is not significantly increased. The reduction of the coil diameter which occurs when the mobility length or the connection length is extracted, however, may lead to a substantially smaller bending radius, it merely being necessary to ensure that the optical fibre is not mechanically damaged. Therefore, in a further embodiment of the invention the turns are arranged about a core whose radius is larger than the mechanically permissible minimum bending radius of the optical fibre and smaller than the minimum bending radius of the optical fibre required to ensure that the attenuation is not increased. A smaller core diameter implies that a greater length of the optical fibre can be extracted In a preferred embodiment which allows for a particularly large length of the optical fibre or fibre ribbon to be extracted, the core is substantially arranged with respect to the outer circumferential surface of the surrounding winding space and shifted towards the neighbouring entrance and exit openings for the optical fibres.

In an embodiment in which the winding spaces for the mobility length and the connection length are arranged in one plane, in one of the winding spaces one of the ends of a fibre ribbon is preferably guided through a guide duct in which its cross-section is rotated through 90° relative to its coiled condition. In that case, no extra space will be required for a fibre ribbon to be guided edge-wise through the storage device.

Storage devices are to be provided at each end of an optical cable. Therefore, two storage devices in accordance with the invention can be adjacently mounted so as to form one unit. Notably when the optical fibres of an optical cable are to be connected to connectors, a compact solution is attractive; this is so characterized in that the winding spaces are arranged on one side of a base plate, the other side of which accommodates a storage device for at least one optical fibre which is to be connected to one of the optical fibres stored in the winding spaces.

BRIEF DESCRIPTION OF THE DRAWING

Embodiments in accordance with the invention will be described in detailed hereinafter with reference to the drawings. Therein.

DETAILED DESCRIPTION OF THE PREFERRED EMBODIMENT

Figure 1:
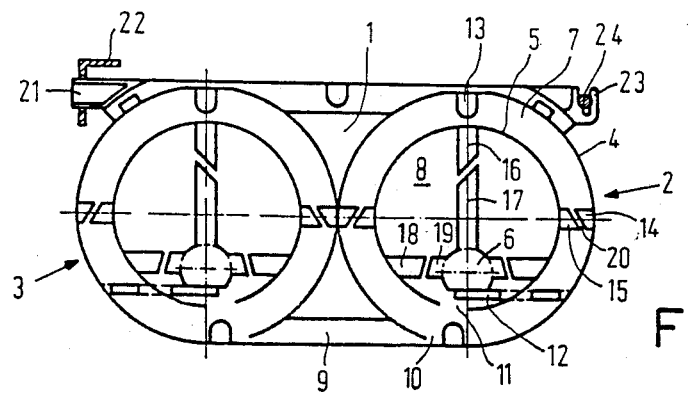
FIG. 1 shows a first embodiment of a storage device constructed in accordance with the invention.

In FIG. 1 two similaly constructed storage devices 2 and 3 in accordance with the invention are arranged on a common base plate 1; therein there are to be stored the respective spare lengths of a fibre ribbon which emerge from ends of two optical cables which are secured, for example in a sleeve housing.

The two storage devices 2 and 3 are identical in a mirror-inverted manner. Consequently, the spare lengths are to be introduced in the opposite winding sense.

On the base plate 1 there are formed upright annular walls 4 and 5 and also a central core 6. Winding spaces 7 ad 8 are formed between the former components.

In the winding space 7 there is to be stored the connection length which is the length of the fibre ribbon required for forming a splice at the area 9. The necessary connection length can be extracted via the opening 10.

In the winding space 8 there is to be stored the mobility length which is the length of the fibre ribbon which is required for the unproblematic removal of the storage devices 2 and 3, arranged on the base plate 1, for example from a stack of similar devices. One end of the mobility length is to be guided, via the opening 11, to the connection length to be accommodated in the winding space 7. The other end is to be guided outside, via the guide duct 12, to the end of the optical cable.

The height of the winding spaces 7 and 8 is limited on the one side by the base plate 1 and on the other side by holding lugs 13, 14, 15 and 16, 17, 18 and 19 which are formed, opposite and parallel to the base plate, on the annular walls 4 and 5 and the inner core 6. This height is slightly greater than the width of the fibre ribbon to be introduced, thus ensuring adequate clearance for the sliding of the fibre ribbon. Inclined slots 20, for example between the holding lugs 14 and 15, enable insertion of the spare lengths of the fibre ribbon without the risk of inadvertent slipping out The spoke-shaped boundary of the winding spaces 7 and 8 leaves large clearances so that the fibre ribbon can be suitably manipulated upon insertion.

The inner core 6 is eccentrically arranged with respect to the annular wall 5 and is situated near the opening 11 as well as near the guide duct 12, so that a large pat of the mobility length can be extracted from the winding space 8 because the turns can become as small as the diameter of the inner core 6. On the other hand, after the mobility length has been returned through the guide duct 12, the diameter of the turns resting against the annular wall 5 will be larg enough to peclude additional attenuation.

The base plate 1 with the storage devices 2 and 3 is inserted into a bore of a mounting rail 22 of a sleeve housing (not shown) by way of a projection 21. The fork 23 is subsequently latched to the mounting rod 24 of the sleeve housing by pivoting.

Figure 12:
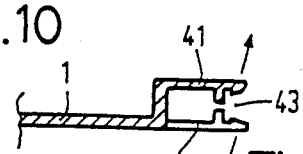
FIG. 12 is a longitudinal sectional view of an entrance duct of the storage devices shown in the FIGS. 1 to 4.

FIG. 12 is a longitudinal sectional view illustrating the construction of the guide duct 12. In the base plate 1 a simple guide duct 12 is formed, which duct is open alternatively at the top and at the bottom. Between the areas 25, 26, 27 and 28 the thickness of a fibre ribbon can be guided in its stretched condition. Thus, at these areas the fibre ribbon extend flatly in the plane of the base plate 1. When it enters the winding space 8, it is rotated through 90° so as to stand on edge.

The intermediate opening 11 is shown to be open in FIG. 1. In order to prevent the pulling of the fibre ribbon from the winding space 7 to the winding space 8 or vice versa at this area, the fibre ribbon or an optical fibre should be retained at this area.

This can be realized by means of the devices shown in the FIGS. 5 to 8.

Figure 5:
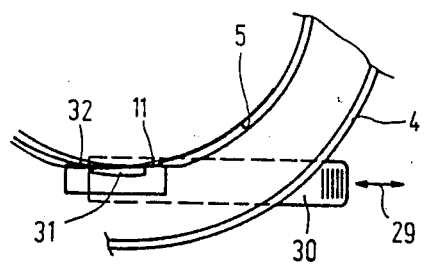
FIGS. 5, 6, 7 and 8 show different clamping devices for securing an optical fibre or ribre ribbon in the transitional zone between a mobility length and a connection length.

FIG. 5 shows a clamping slide 30 which can be displaced in the base plate in the direction of the double arrow 29 and which clamps, by way of an angular portion 31, the fibre ribbon passed through the opening 11 against the end 32 of the annular wall 5.

Figure 6:
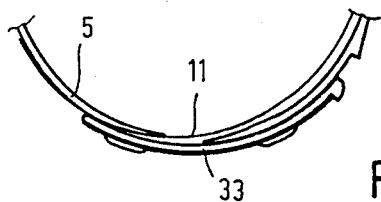

FIG. 6 shows a clamping segment 33 which acts in the same way and which can be guided on the annular wall 5 across the area of the intermediate opening 11.

Figure 7:
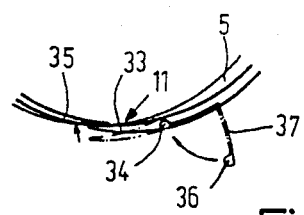

In the embodiment shown in FIG. 7, the end regions of the annular wall 5 overlap at the area of the opening 11, the outer overlap end 33 being slidable inwards towards the other overlap region 35 because of the groove 34. This is realized by means of the thickened portion 36 of the pivot arm 37 formed on the annular wall 5 via a film hinge. The thickened portion 36 is pressed into the narrower groove 34, so that the overlap end 33 is pressed out of the positioned denoted by dashed lines until it contacts the overlap end 35. The fibre ribbon is retained therebetween.

Figure 8:
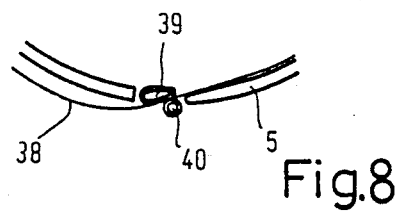

FIG. 8 shows a particularly simple clamping device which, however, cannot be adjusted so as to be non-clamping. The fibre ribbon 38 is elastically clamped between the mandrels 39 and 40 having a soft-elastic cover.

Figure 13:
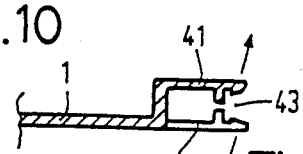
FIG. 13 shows an attractive mount for a joint.
Figure 14:
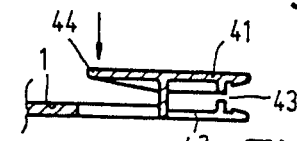
FIG. 14 shows a further attractive mount for a joint.

The joints to be formed at the area 9 in FIG. 1 can be attractively secured by means of integrated mounts of the kind shown in the FIGS. 13 and 14.

FIG. 13 shows flexible clamping arms 41 and 42 which are arranged on the base plate 1 at a distance form one another in the plane of drawing and which have been displaced with respect to one another in the direction perpendicular to the plane of drawing; these clamping arms form a space for a joint which is accessible via a gap 43. The gap 43 can be adequately increased by bending the clamping arms 41 and 42.

The gap 43 of the embodiment shown in FIG. 14 can be increased by pressing the lever 44 in the direction of the arrow.

The devices shown in the FIGS. 5 to 8 and 13 and 14 can also be used in the embodiments of storage devices which are diagrammatically shown in the FIGS. 2 to 4 or 9 to 11. A guide duct as shown in FIG. 12 can also be used for the embodiment shown in the FIGS. 2 to 4.

Figure 4:
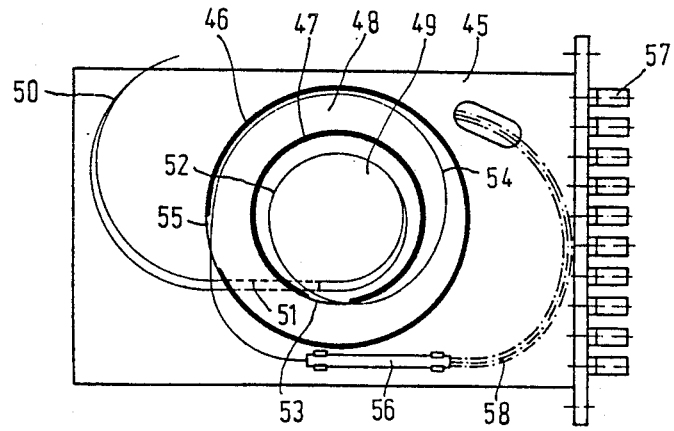

FIG. 4 is a plan view of a storage device which is arranged on a base plate 45 and which comprises winding spaces 48 and 49 between the annular walls 46 and 47. The fibre ribbon 50 emerging from an end of an optical cable (not shown) enters via the guide duct 51, the inner winding space 49 where it constitutes an extractable mobility length in the form of at least one turn 52. Subsequently, the fibre ribbon 50 passes through the opening 53 to the outer winding space 48 in which it constitutes, again in the form of at least one turn 54, a connection length which can be extracted through the opening 55, in the circumference.

Figure 2:
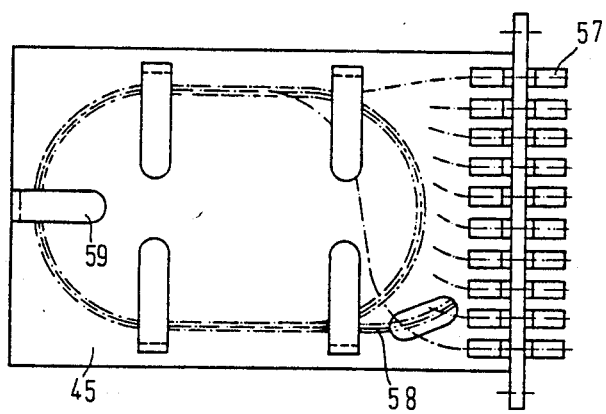
FIGS. 2, 3 and 4 are different views of an alternative embodiment of a storage device in accordance with the invention.
Figure 3:
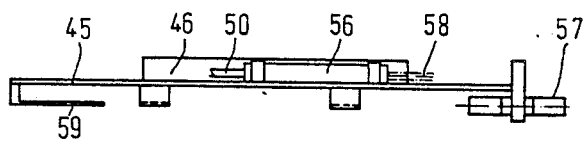

The individual fibres of the fibre ribbon 50 are fed, via the joint 56 to the connectors 57 by way of single optical fibres. The single optical fibres 58 are guided to the rear of the base plate 45 through the opening 59. The further course of the single fibres 58 on the rear of the base plate 45 is shown in FIG. 2. At least one turn of the spare lengths of the single optical fibres 58 are stored underneath the holding clamps 59. FIG. 3 shows an associated side elevation.

Figure 9:
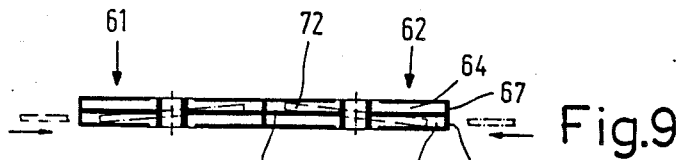
FIGS. 9, 10 and 11 are various views of a further embodiment in accordance with the invention.
Figure 10:
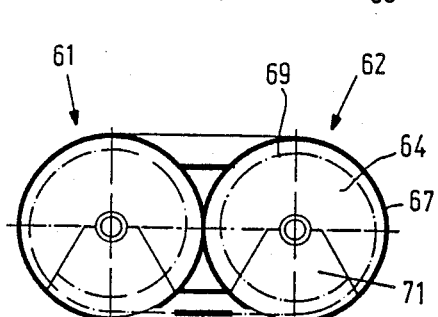
Figure 11:
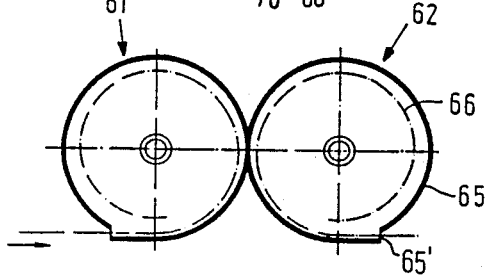

In comparison with the device shown in FIG. 1, in the device which is shown in the FIGS. 9 to 11 the winding spaces for the mobility length and the connection length are situated on different sides of a central plate 60. Because the storage devices 61 and 62 are again identical in a mirror-inverted manner (line in FIG. 1), only the right-hand storage device 62 will be described in detail. Contrary to FIG. 1, the winding spaces 63 and 64 for the mobility length and the connection length, respectively, are identical and are oppositely situated on different sides of the central plate 60. The outer annular wall 65 of the winding space 63 comprises an opening 65' wherethrough the mobility length in the form of the turn 66 of the fibre ribbon can be extracted (FIG. 11).

The corresponding annular wall 67 of the winding space 64 comprises opening 68 wherethrough the connection length in the form of the turn 69 can be extracted, said length being guided to the joint 70 (FIG. 10). At the area 71 the central plate 60 is punctured so that the intermediate section 72 (FIG. 9) of the fibre ribbon 50 can be guided from the winding space 63 to the winding space 64 in an inclined manner.

What is claimed is:

1. A storage device for a spare length of at least one optical fibre which emerges from a cable end, which storage device can be arranged in the vicinity of the cable end and comprises a flat storage space in which the spare length is arranged in the form of a coil, an end of optical fibre which leads to a joint being extractable, during which operation the diameter of the coil is reduced, the storage space comprising guide walls which determine the minimum inner coil diameter, the maximum outer coil diameter and the axial height, and a core (6) whose radius is larger than the mechanically permissible minimum bending radius of the optical fibre or fibre ribbon and smaller than the minimum bending radius of the optical fibre or fibre ribbon required to ensure that attenuation is not increased, characterized in that the storage space is subdivided into two winding spaces (7, 8, 48, 49), one of which (8, 48) accommodates the connection lengths (54) required for forming the joint (56) while the other winding space (7, 49) accommodates a mobility length (52) required for moving the storage device away from the cable end, lengths of the optical fibre being independently slidably extractable from and insertable into their respective winding spaces.

2. A storage device as claimed in claim 1, characterized in that a part of the optical fibre or fibre ribbon which is situated between the mobility length and the connection length is secured to the storage device by a clamping device.

3. A storage device as claimed in claim 2, characterized in that the clamping device is formed by soft-elastic elements (39, 40) wherebetween the optical fibres or fibre ribbon are retained.

4. A storage device as claimed in claim 2, characterized in that the clamping device comprises a slidable element (33, 30, 37) whereby the optical fibre or fibre ribbon can be pressed against a fixed wall.

5. A storage device as claimed in claim 1, characterized in that the mobility length (52) and the connection length (54) are wound in a coiled manner.

6. A storage device as claimed in claim 1, characterized in that in a storage device constructed for the storage of a single optical fibre the distance between the guide walls is smaller than 1.3 times the thickness of the optical fibre.

7. A storage device as claimed in claim 1, characterized in that in a storage device constructed for the storage of a fibre ribbon consisting of a flat arrangement of juxtaposed optical fibres the distance between the guide walls is slightly larger than the width of the fibre ribbon.

8. A storage device as claimed in claim 1, characterized in that the winding spaces are arranged to coaxially with respect to one another.

9. A sotrage device as claimed in claim 8, characterized in that the winding spaces are arranged so as to be interleaved in one plane.

10. A storage device as claimed in claim 9, characterized in that in one of the winding spaces one of the ends of a fibre ribbon is guided through a guide duct in which its cross-section is rotated through 90° relative to its coiled condition.

11. A storage device as claimed in claim 8, characterized in that the winding spaees are arranged coaxially on one over the other.

12. A storage device as claimed in claim 1, characterized in that the core (6) is eccentrically arranged with respect to the outer circumferential surface (5) of the surrounding winding space (8) and shifted towards the neighbouring entrance and exit openings (11 and 12), respectively for the optical fibres of fibre ribbon.

13. A device as claimed in claim 1, characterized in that the winding spaces are arranged on one side of a base plate, the other side of which accommodates a storage devicefor at least one optical fibre which is to be connected to one of the optical fibres stored in the winding spaces.

14. A storage device for a spare length of at least one optical fibre for connection to a cable end, said storage device being arrangeable proximate to the cable end and including a flat storage space in which the spare length is arranged in coiled form, an end of the optical fibre leading to the cable connection being extractable during which the diameter of the coil is reduced, the storage space comprising a core and guide walls which determine the minimum inner coil diameter, the maximum outer coil diameter and the axial height wherein the improvement comprises: wherein said first and second optical fibres are arranged about said core, said core having a radius larger than the mechanically permissible minimum bending radius of the optical fibre and smaller than the minimum bending radius of the optical fibre required to insure that light attenuation in the optical fibre is not increased, the storage space being subdivided into first and second winding spaces, said first winding space accommodating a first length of fibre required for forming the connection while the second winding space accommodates a second mobility length for permitting the device to be moved away from the cable end, said first length and said second length of said optical fibre being independently slidably extractable from and insertable into said first and second winding spaces.

15. The storage device as claimed in claim 14 wherein said first and second winding spaces are disposed concentrically.

16. The storage device as claimed in claim 14 wherein said first and second winding spaces are disposed concentrically on opposite sides of a base plate.

17. The storage device as claimed in claim 14 wherein the portion of the optical fibre which is situated between the mobility length and the connection length is secured to the storage device by a clamping device.

18. The storage device as claimed in claim 17 characterized in that the clamping device comprises elastic means engaging said optical fibres.

19. The storage device as claimed in claim 14 wherein said core is eccentrically arranged with respect to said winding spaces.

* * * * *